United States Patent
Jiang et al.

(10) Patent No.: US 10,559,194 B2
(45) Date of Patent: Feb. 11, 2020

(54) SYSTEM AND METHOD FOR PROVIDING CUSTOMIZED CONNECTED DEVICE FUNCTIONALITY AND FOR OPERATING A CONNECTED DEVICE VIA AN ALTERNATE OBJECT

(71) Applicant: Samsung Electronics Co., Ltd., Suwon-si, Gyeonggi-do (KR)

(72) Inventors: Long Jiang, Santa Clara, CA (US); Tao Ma, Milpitas, CA (US); Julie Zhu, Saratoga, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/961,443

(22) Filed: Apr. 24, 2018

(65) Prior Publication Data

US 2019/0266886 A1 Aug. 29, 2019

Related U.S. Application Data

(63) Continuation of application No. 62/634,670, filed on Feb. 23, 2018.

(51) Int. Cl.
*G08C 17/02* (2006.01)
*H04L 29/08* (2006.01)
(Continued)

(52) U.S. Cl.
CPC ............ *G08C 17/02* (2013.01); *G06F 16/51* (2019.01); *G06F 16/58* (2019.01); *G06F 16/5838* (2019.01); *H04L 67/125* (2013.01); *H04W 4/021* (2013.01); *G06F 3/0484* (2013.01); *G06K 9/00268* (2013.01); *G08C 2201/70* (2013.01)

(58) Field of Classification Search
CPC ..... G08C 17/02; G06F 16/5838; G06F 16/51; G06F 16/58; H04L 67/125; H04W 4/021
See application file for complete search history.

(56) References Cited

U.S. PATENT DOCUMENTS

| 9,773,285 B2 | 9/2017 | Calman et al. |
| 2009/0141019 A1 | 6/2009 | Lobko et al. |

(Continued)

FOREIGN PATENT DOCUMENTS

CN 104640237 A 5/2015

*Primary Examiner* — Nabil H Syed
(74) *Attorney, Agent, or Firm* — Innovation Counsel LLP

(57) ABSTRACT

A system and method in a mobile device for controlling a connected device is disclosed. In one embodiment, the method includes receiving an image; processing the image to identify at least a first image attribute where the first image attribute includes an image feature or an image object; accessing a database of connected devices, each connected device in the database being identified by a linked image and being associated with device metadata describing at least a device type of the connected device; comparing the first image attribute with the linked images corresponding to the connected devices stored in the database; identifying a first connected device having a linked image matching the first image attribute; and in response to the identifying, providing a user interface configured to control the first connected device, the user interface including a control function corresponding to the device type of the first connected device.

20 Claims, 10 Drawing Sheets

(51) Int. Cl.
*H04W 4/021* (2018.01)
*G06F 16/51* (2019.01)
*G06F 16/58* (2019.01)
*G06F 16/583* (2019.01)
G06F 3/0484 (2013.01)
G06K 9/00 (2006.01)

(56) References Cited

U.S. PATENT DOCUMENTS

| | | | | |
|---|---|---|---|---|
| 2010/0317332 | A1* | 12/2010 | Bathiche | H04B 1/202 455/418 |
| 2012/0154108 | A1* | 6/2012 | Sugaya | H04N 21/4126 340/5.1 |
| 2013/0321124 | A1* | 12/2013 | Shibata | G05B 1/01 340/5.6 |
| 2014/0070919 | A1* | 3/2014 | Jackson | G08C 17/02 340/5.61 |
| 2014/0225914 | A1 | 8/2014 | Kasahara et al. | |
| 2014/0235265 | A1* | 8/2014 | Slupik | H04W 4/02 455/456.1 |
| 2014/0357280 | A1 | 12/2014 | Rao et al. | |
| 2015/0187357 | A1 | 7/2015 | Xia et al. | |
| 2015/0261293 | A1* | 9/2015 | Wilairat | G06F 3/013 345/156 |
| 2016/0299735 | A1* | 10/2016 | Oztaskent | G06F 3/033 |
| 2017/0075328 | A1* | 3/2017 | Zhang | G05B 19/042 |
| 2017/0169614 | A1 | 6/2017 | Tommy et al. | |
| 2017/0331906 | A1 | 11/2017 | Choi et al. | |

* cited by examiner

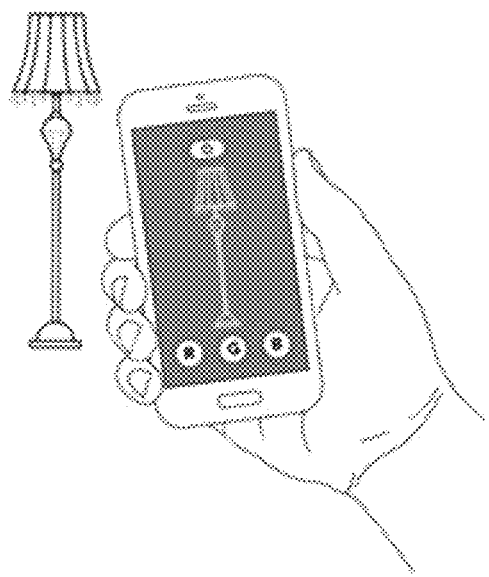
FIG. 7(a)
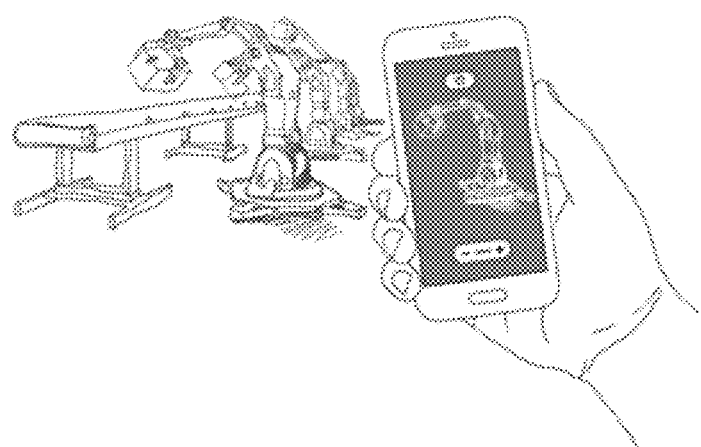
FIG. 7(b)
FIG. 7

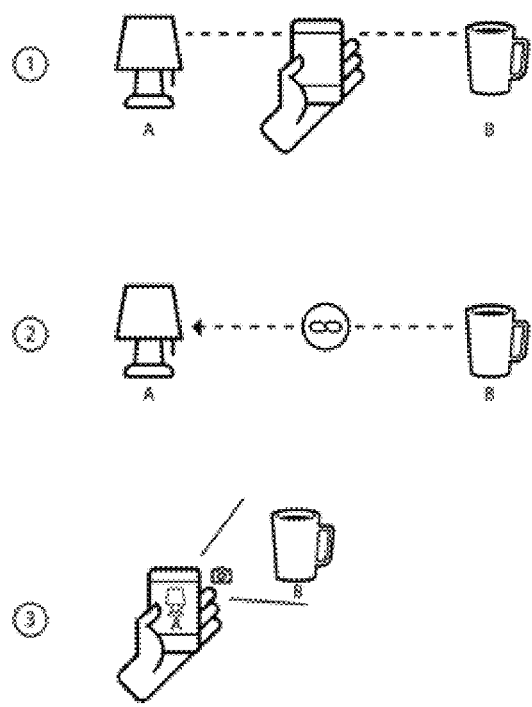
FIG. 8(a)
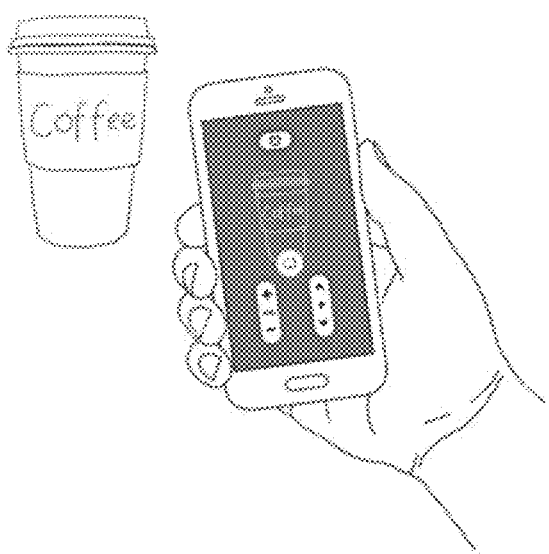
FIG. 8(b)
FIG. 8

SYSTEM AND METHOD FOR PROVIDING CUSTOMIZED CONNECTED DEVICE FUNCTIONALITY AND FOR OPERATING A CONNECTED DEVICE VIA AN ALTERNATE OBJECT

CROSS REFERENCE TO RELATED APPLICATIONS

This application claims priority to U.S. Provisional Patent Application No. 62/634,670, entitled SYSTEM AND METHOD FOR PROVIDING CUSTOMIZED CONNECTED DEVICE FUNCTIONALITY AND FOR OPERATING A CONNECTED DEVICE VIA AN ALTERNATE OBJECT, filed Feb. 23, 2018, which is incorporated herein by reference for all purposes.

FIELD

The present disclosure relates to a system and a method for providing control of connected devices and, in particular, to a system and method for providing customized control to operate connected devices through image recognition.

BACKGROUND

With the advent of the Internet and the wide adoption of smartphones, the "smart home" concept or home automation can be realized where appliances and devices in a home can be connected to the Internet and be capable of being monitored and controlled remotely. However, implementation of Internet controllable devices, referred to as Internet-of-Things (IoT) devices, in homes or offices remains challenging in various aspects.

For example, an environment with multiple IoT devices or connected devices being installed in a closed proximity presents challenges to a user. For instance, it is sometimes difficult to identify which IoT device is the one referenced inside a particular application (App). This could lead to turning ON or OFF the incorrect IoT device unintentionally. Alternately, a user may opt for voice commands. However, when there are multiple devices, it is difficult for the user to remember the designated name of each IoT device when it was originally programmed. Also, voice command is only good for simple interactions, such as short commands of On, Off, Higher, and Lower. Voice commands have limitations in providing general control.

Conventional methods for controlling or operating IoT devices uses applications (Apps) that are installed on a mobile device. As each IoT device may have its own associated App, a user may have to navigate around to locate a specific App for a specific IoT device. Furthermore, the user interface for each App are often designed differently. With multiple IoT devices and different styled Apps, a user often finds it confusing and difficult to master the navigation of each App for controlling the multiple IoT devices.

SUMMARY

The present disclosure discloses a device and method for controlling a connected device in a mobile device, substantially as shown in and/or described below, for example in connection with at least one of the figures, as set forth more completely in the claims.

These and other advantages, aspects and novel features of the present disclosure, as well as details of an illustrated embodiment thereof, will be more fully understood from the following description and drawings.

In embodiments of the present disclosure, a method in a mobile device for controlling a connected device includes receiving, at the mobile device, an image; processing, at the mobile device, the image to identify at least a first image attribute, the first image attribute including an image feature or an image object; accessing, by the mobile device, a database of connected devices, each connected device in the database being identified by a linked image and being associated with device metadata describing at least a device type of the connected device; comparing the first image attribute with the linked images corresponding to the connected devices stored in the database; identifying a first connected device having a linked image matching the first image attribute; and in response to the identifying, providing, at the mobile device, a user interface configured to control the first connected device, the user interface including a control function corresponding to the device type of the first connected device.

In embodiments of the present disclosure, a system for controlling a connected device includes an imaging sensing device configured to receive an image; a processor; a communication interface; a display; and a memory coupled with the processor, wherein the memory is configured to provide the processor with instructions which when executed cause the processor to: receive an image; process the image to identify at least a first image attribute, the first image attribute including an image feature or an image object; access a database of connected devices, each connected device in the database being identified by a linked image and being associated with device metadata describing at least a device type of the connected device; compare the first image attribute with the linked images corresponding to the connected devices stored in the database; identify a first connected device having a linked image matching the first image attribute; and in response to the identifying, provide a user interface configured to control the first connected device, the user interface including a control function corresponding to the device type of the first connected device.

BRIEF DESCRIPTION OF THE DRAWINGS

Various embodiments of the present disclosure are disclosed in the following detailed description and the accompanying drawings.

FIG. 7, which includes FIGS. 7(a) and 7(b), illustrates example applications of the image-based user interaction system in some embodiments.

FIG. 8, which includes FIGS. 8(a) and 8(b), illustrates example applications of the image-based user interaction system in some embodiments.

DETAILED DESCRIPTION

Figure 1:
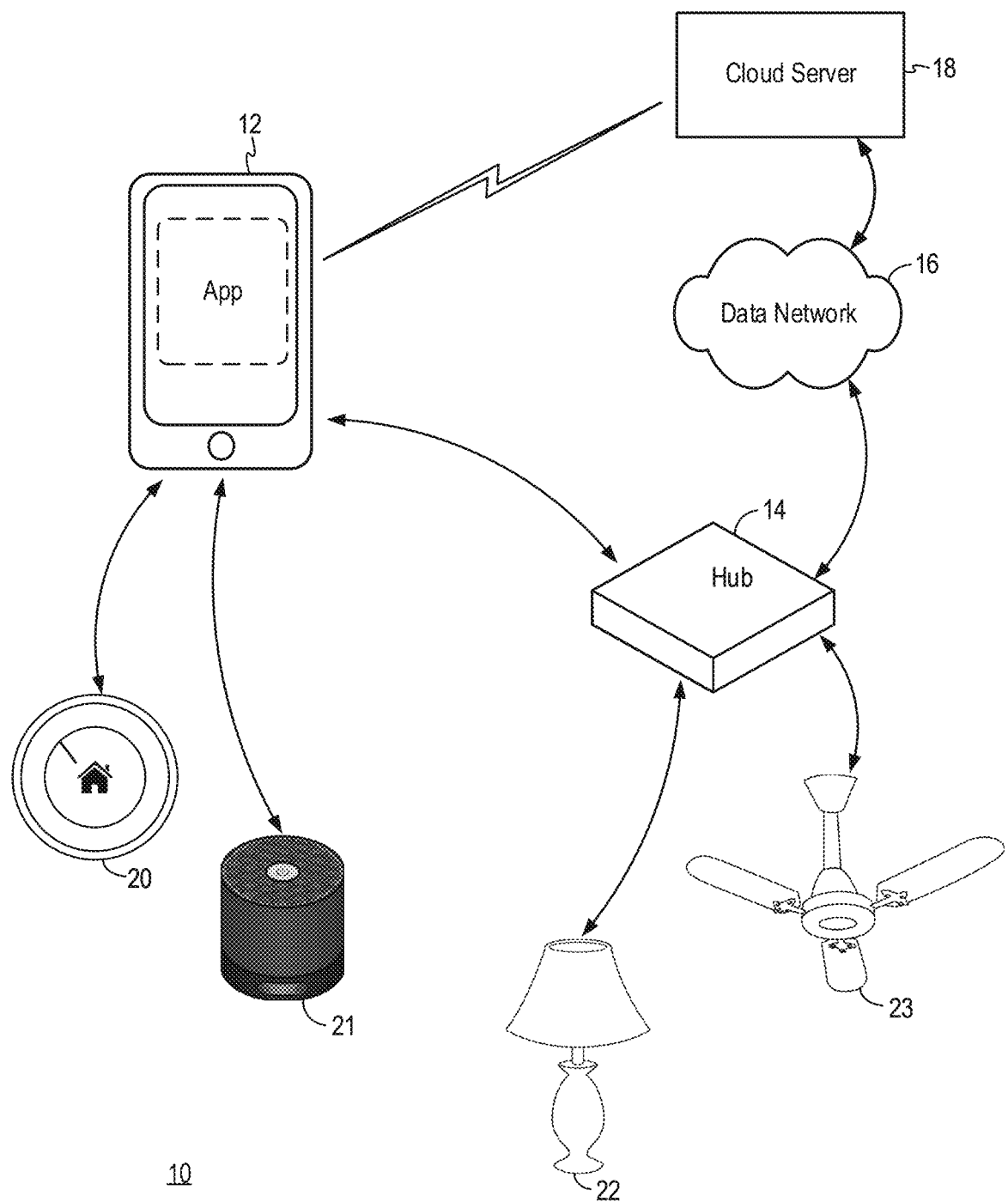
FIG. 1 illustrates an environment in which the image-based user interaction system of the present disclosure can be implemented.

The present disclosure can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided below along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

According to embodiments of the present disclosure, a system and method in a mobile device for controlling a connected device processes an image to identify the connected device to be controlled and provides a user interface including control functions associated with the identified connected device. In some embodiments, the image includes the desired connected device. In other embodiments, the image is of a dummy device that is not the connected device but is linked to the connected device. In another embodiment, the image may be a human face identifying a user. In yet another embodiment, the image may be a location in which the connected device is located. The system and method of the present disclosure provides an easy and quick way for users to interact with connected devices by using a mobile device to take an image of the connected device or a linked dummy device. The control functions for the specific connected device desired by the user can be provided instantly on the mobile device, without requiring the user to search for the connected device on in an application or to search for the particular application associated with the connected device.

In some embodiments, the image-based user interaction system and method of the present disclosure uses machine learning and computer vision to recognize image features or an image object from an image and automatically display the corresponding device user interface (UI) for controlling the connected device linked to the image features or object. In particular, a unified application (App) can be used to control all types of connected devices, improving the accessibility and ease of use of all types of connected devices.

In the present description, connected devices refer to devices that have the capability to be connected to a data network and have functionalities that can be controlled remotely through the data network. The data network can include a cellular data network, a Wi-Fi data network, or other types of data communication network, such as Bluetooth, Zigbee, Thread. In the present description, connected devices are sometimes referred to as Internet-of-Things (IoT) devices and are generally devices applied in home or office automation applications. In some cases, a connected device may be connected to the data network through a hub. In operation, the hub functions as a bridge to enable a device to be connected to the data network. In this manner, a connected device can be controlled and operated through the hub without requiring the connected device to implement full network communication capability.

In the present description, a dummy device refers a device that is not the actual connected device for which control and operation is desired. A dummy device can be any object and can be device that may or may not have the capability to be connected to a data network. When used as a dummy device, the ability of the device to be connected to a data network is irrelevant as the user interaction system is not attempting to control or operate the dummy device itself. In some examples, the dummy device can be an everyday object, such as a bicycle, a cup, a toaster. The dummy device may be an unconnected device that does not have the capability to be connected to a data network. Alternately, the dummy device can be a device that has the capability to be connected to a data network but is offline or not registered with the system of the present disclosure and for which control and operation through the user interaction system is not sought.

In the present description, an application, or an App, refers to software components that is configured to monitor, control and automate connected devices installed in an environment or at a location. In embodiments of the present disclosure, the image-based user interaction system enables a user to operate or control all of the user's connected devices using a single control application (control App). The user no longer needs to rely on device-specific App for each connected device. In embodiments of the present disclosure, the image-based user interaction system uses a camera to recognize the connected device or the linked dummy device, a human face, or the environment where the connected device is located, and build a control link between the connected device and the control application either over a cloud data network or a local data network. In this manner, the image-based user interaction system leverages computer vision technologies to create a user interaction that maps physical items to virtual user interface. The user interaction system simplifies the user experience when interacting with multiple connected devices on different technologies.

The image-based user interaction system is particularly advantageous when applied in an environment where a wide range of connected devices is deployed within an area and the user is looking to control each connected device in a different fashion. In some embodiments, the image-based user interaction system implements the following functions.

In a first example, the user interaction system uses the control App to identify a connected device by visual information of the connected device and provides the user with a user interface (UI) for device operation designated for the connected device. Alternately, the control App may identify a dummy device that is linked to the connected device and provides the user with a user interface (UI) for device operation designated for the connected device.

In a second example, the user interaction system uses the control App to identify the user, such as based on facial recognition, and provides the user with a list of connected devices based on the user's previous behaviors. For example, the list can be the user's most frequently used or most recently used connected devices.

In a third example, the user interaction system uses the control App to determine the location of the user, such as using geolocation, and provides the user with a list of connected devices nearby or in the vicinity of the determined location. For example, the list can be the user's most frequently used or most recently used connected devices associated with the current location.

The image-based user interaction system of the present disclosure implements many advantageous features. First, the image-based user interaction system uses computer vision and machine learning to perform the initial device on-boarding using a digital camera. The system further retrieves a particular device from the set of on-boarded devices using the digital camera and computer vision. The image-based user interaction system enables a user to easily identify and control his/her connected device, representing a marked improvement over voice enable control methods. In this manner, there is no need to remember the assigned name for each connected device in order to control or operate the device.

Second, the image-based user interaction system learns user preference, such as the most commonly used connected devices. Alternately, the system associates the most commonly used connected devices to user's facial image or to a geolocation. The user can save a lot of time by eliminating the need to navigate among different devices to search for the desired connected device to control. A user can quickly select his/her own most accessed connected devices based on facial recognition or geolocation.

Third, based on the image being scanned, the system links a matching virtual control user interface to an actual physical device control interface. After the link is established between physical device and virtual UI, the user can use the control App to control the physical device using the virtual control UI. The image-based user interaction system enables ease of use as the user no longer has to search for the right control UI for each particular connected device.

FIG. 1 illustrates an environment in which the image-based user interaction system of the present disclosure can be implemented. Referring to FIG. 1, multiple connected devices 20-23 are installed in an environment 10, which can be a home, an office, a manufacturing site, or an outdoor location. In the present illustration, the connected devices include a thermostat 20, a Bluetooth speaker 21, a lamp 22 and a fan 23. The connected devices may communicate with a data network, such as data network 16, to be monitored, controlled and operated. The data network 16 can include a cellular data network, a Wi-Fi data network, or other types of data communication network. In some cases, the connected device, such as lamp 22 and fan 23, may be connected to a hub 14 to be controlled or operated. The connected devices may communicate with the hub 14 using short range or low power communication protocols, such as Bluetooth, Zigbee, and Thread. In some examples, a web-based central server, referred to as cloud server 18, may provide remote monitoring and control of the connected devices 20-23. In the present illustration, cloud server 18 is representative of one or more web-based servers configured for controlling respective connected devices.

A user may control and operate the connected devices 20-23 using a mobile device 12, such as a smartphone or a tablet. The mobile device 12 may communicate with the connected devices 20-23 through the data network 16 or through the hub 14, using a wireless or cellular connection. In one example, a user may access the services provided by cloud server 18 to remotely control and operate the connected devices 20-23.

Using the conventional control scheme, the user may need to access different Apps for controlling each connected device. For example, the thermostat 20 may have its own associated App while the home assistant 21 may use another App for its control and operation. Searching for and managing all the different Apps for different connected devices may be cumbersome for the user. Furthermore, each App may have a different user interface design, requiring the user to navigate different user interfaces to figure out the control function.

Embodiments of the present disclosure provide an image-based user interaction system that enhances the user experience by enabling a user to interact with connected devices using an image-based device access scheme and using a unified control application (control App), as will be described in more detail below.

Figure 2:
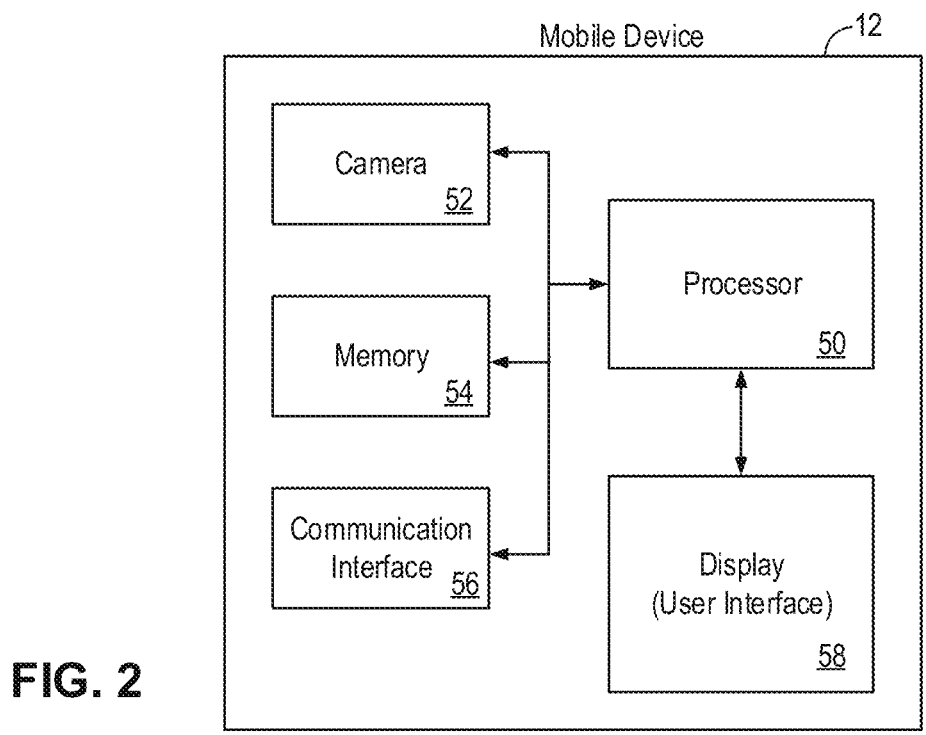
FIG. 2 is a schematic diagram of a mobile device in which the image-based user interaction system can be implemented in some examples.

FIG. 2 is a schematic diagram of a mobile device in which the image-based user interaction system can be implemented in some examples. Referring to FIG. 2, a mobile device 12 includes a digital camera 52 for capturing a digital image, a memory 54 for storing data, a communication interface 56 for supporting cellular and/or wireless communication, and a display 58 providing the user interface. The mobile device 12 includes a processor 50, which can be a micro-controller or a micro-processor, for controlling the operation of the mobile device. In some embodiments, the processor 50 may implement a computer vision sub-system.

Figure 3:
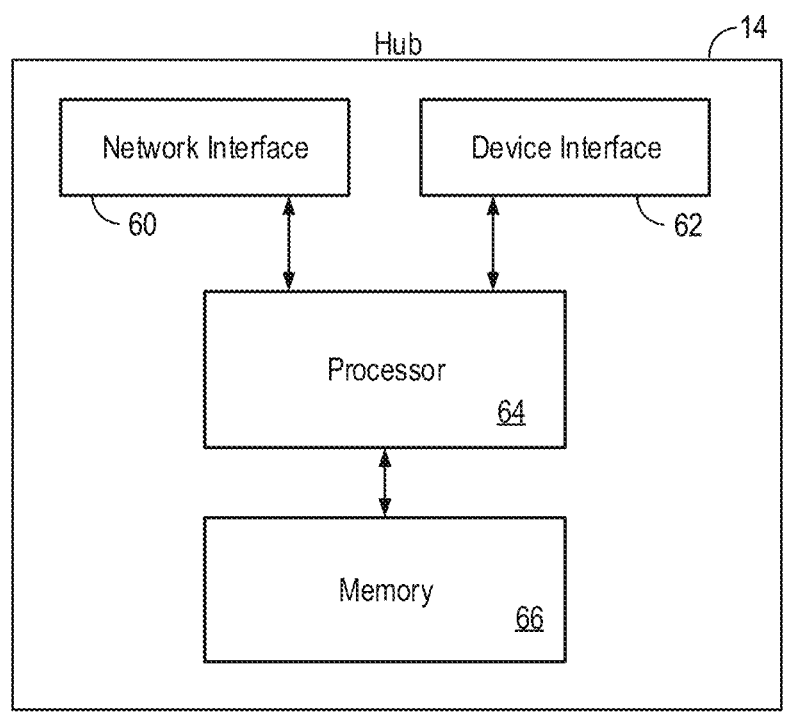
FIG. 3 is a schematic diagram of a hub which can be implemented in the environment 10 of connected devices in some examples.

FIG. 3 is a schematic diagram of a hub which can be implemented in the environment 10 of connected devices in some examples. Referring to FIG. 3, the hub 14 may be deployed in an environment to function as a bridge for communicating with and controlled connected devices. The hub 14 includes a network interface 60 for communicating with a data network, such as data network 16, to enable communication with the cloud server 18. The hub 14 may further include a device interface 62 for communicating with connected devices. In some examples, the network interface 60 may be a wired interface or a wireless interface, such as an Wi-Fi interface. Meanwhile, the device interface 62 may be a wireless interface, implementing Wi-Fi communication and/or other short-range, low power wireless communication, such as Bluetooth or Zigbee or Thread. The hub 14 includes a processor 64 controlling the operation of the hub and a memory 66 storing data.

The image-based user interface system and method provides control functionalities for connected devices by assessing a database of connected devices. The connected devices are on-boarded to the database through an on-boarding process in accordance with the present disclosure.

In the present description, the connected devices are assumed to have completed the device registration process so that the connected devices are connected to existing data networks and are performing their intended functions. In some cases, the connected devices may have completed a device registration process with a cloud server associated with a manufacturer of the connected device. In other cases, the connected devices may have completed a device registration process and are connected to a hub local to the connected devices where the hub facilitates the communication with a remote cloud server to support the intended functionality of the connected device. For example, a smart light switch from ACME, Inc. will have completed a device registration process with the ACME cloud server to enable the smart light switch to be operated by an ACME application on the mobile device of the user. Alternately, the smart light switch may have completed a device registration process through a local hub and is configured to communicate with the hub acting as a bridge to communicate with the ACME cloud server. The device registration process for a connected device to connect to the existing data networks to provide its intended functionality is known in the arts and is not part of the image-based user interaction system and method. In particular, implementation of the image-based user interaction system and method assumes that the connected devices have been registered with their respective cloud servers of the manufacturers or providers and are operating to provide their intended functionality. The image-based user interaction system and method of the present disclosure uses visual information to provide enhanced control functions for the connected devices.

On-Boarding Method for Connected Devices

Figure 4:
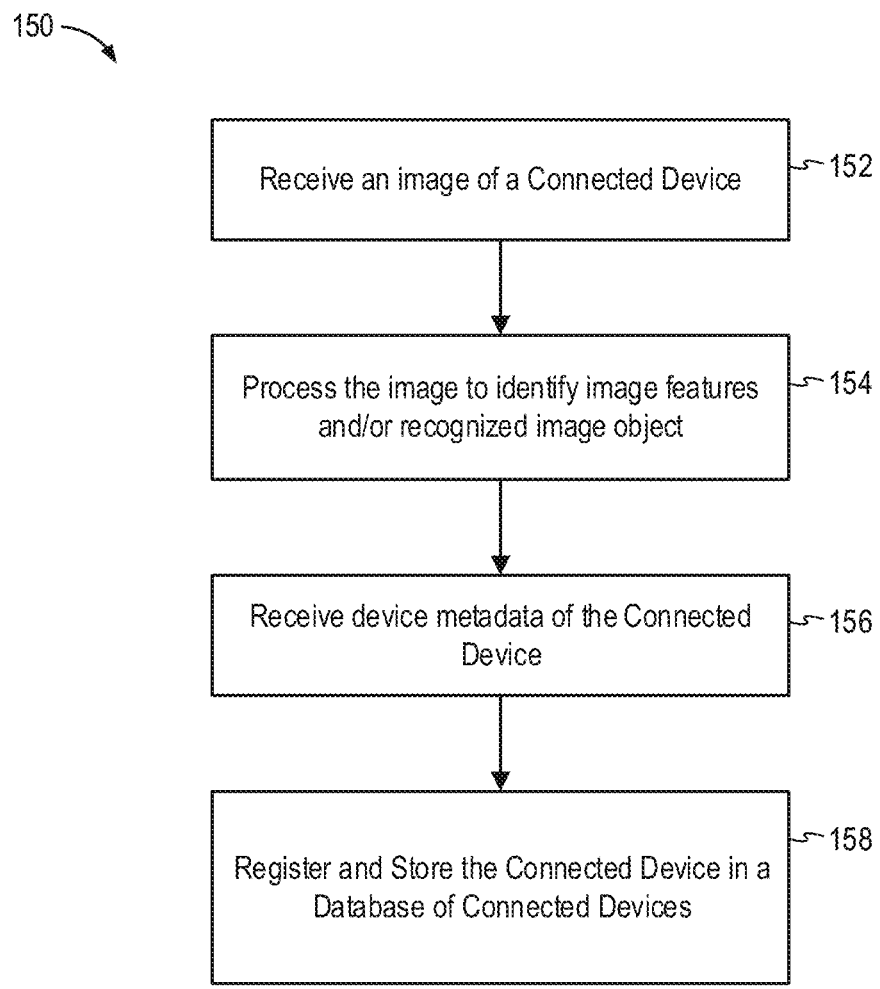
FIG. 4 is a flowchart illustrating a method to on-board a connected device in some embodiments.

FIG. 4 is a flowchart illustrating a method to on-board a connected device in some embodiments. Referring to FIG. 4, a connected device on-boarding method 150 may be implemented in a mobile device and executed by the control App in embodiments of the present disclosure. At step 152, the method 150 initiates the control App and detects an image in the camera field of view where the image contains the connected device to be on-boarded. It is instructive to note that the on-boarding method does not necessarily require the camera to capture or snap the image. In some embodiments, it is only necessary that an image is present in the camera field of view.

At step 154, the method 150 processes the image to identify image features and/or a recognized image object. In one embodiment, the computer vision sub-system in the processor of the mobile device may be initiated to scan the image content in the camera field of view (FOV). The computer vision sub-system extracts image features from the field of view, which can be used as a unique representation of the connected device and the device's surrounding environment. In some embodiments, the computer vision sub-system may also run a vision-based object recognition method to recognize the connected device to be on-boarded. In the present description, image features refer to derived values that are informative and descriptive of the image, such as edges and contours in the digital image. In the present description, image objects refer to instances of semantic objects in the digital image, such as a vase, a lamp or a human. In the following description, the term "image attributes" is sometimes used to refer collectively to image features or image object of an image.

At step 156, the method 150 receives device metadata associated with the connected device. The device metadata may include device information such as the device type, the brand, the model, the operational property and other attributes of the connected device. The device metadata information is provided to enable the user to interact with the connected device later. Using the device metadata information, the user interaction system of the present disclosure is then able to assign the corresponding user interface, to determine the functional properties and the communication protocol of the connected device.

At step 158, the method 150 registers the connected device and stores the connected device in the database of connected devices. In the present description, registering a device refers to adding or entering the device into the image-based user interaction system of the present disclosure using information provided about the device. In particular, the connected device is stored in the database identified by the image features or recognized image object as the linked image. The associated device metadata is also stored with the connected device in the database.

In embodiments of the present disclosure, the database of connected devices may be stored in the mobile device. Alternately, the database may be stored in the hub in the environment of connected devices and the mobile device access the hub, such as hub 14 in FIG. 1, to access the database. In yet another embodiment, the database may be stored in a remote server, such as the cloud server 18 of FIG. 1, and the mobile device accesses the cloud server to access the database.

Using the connected device on-boarding method 150, one or more connected devices may be on-boarded or registered with the image-based user interaction system. In embodiments of the present disclosure, the image-based user interaction system implements a first control scheme referred to as "See-it, Control-it" scheme. Under the See-it, Control-it control scheme, the image-based user interaction system enables a mobile device to control a connected device by aiming the camera of the mobile device to the connected device itself. That is, presenting an image of a connected device enables control of that connected device.

In some cases, the user may wish to control a connected device that is not necessarily in view of the user. In other cases, connected devices cannot be reached via voice command or touch command or by an IR remote due to location challenge. In embodiments of the present disclosure, the image-based user interaction system implements a second control scheme referred to as "See-this, Control-that" scheme. Under the See-this, Control-that control scheme, the image-based user interaction system enables a connected device to be linked to a dummy device. The dummy device is used as a substitute object or an alternate object to represent the connected device. The mobile device can then control the connected device by aiming the camera of the mobile device to the linked dummy device. That is, presenting an image of a dummy device enables control of a linked connected device. In other words, the mobile device may be used to scan an image of the dummy device and the user interface for controlling the linked connected device will be presented.

As described above, a dummy device refers a device that is not the actual connected device for which control and operation is desired. A dummy device, or a substitute device, can be an object or an item of any shape, size or form as long as it can be recognized by the computer vision sub-system. For example, the dummy device can be a pattern, a picture, a human face, a number, a hand gesture (e.g. thumbs up), or a physical object, such as a kitchen appliance. In some embodiments, the dummy device can be any animated objects (e.g., a dog or a cat) or any inanimate objects (e.g., a cup or a book). The dummy device does not have to be connected to a data network.

To facilitate the See-this, Control-that control scheme, a dummy device on-boarding and linking method is used to on-board the dummy device and link the dummy device to the actual connected device it represents.

On-Boarding and Linking Method for Dummy Devices

Figure 5:
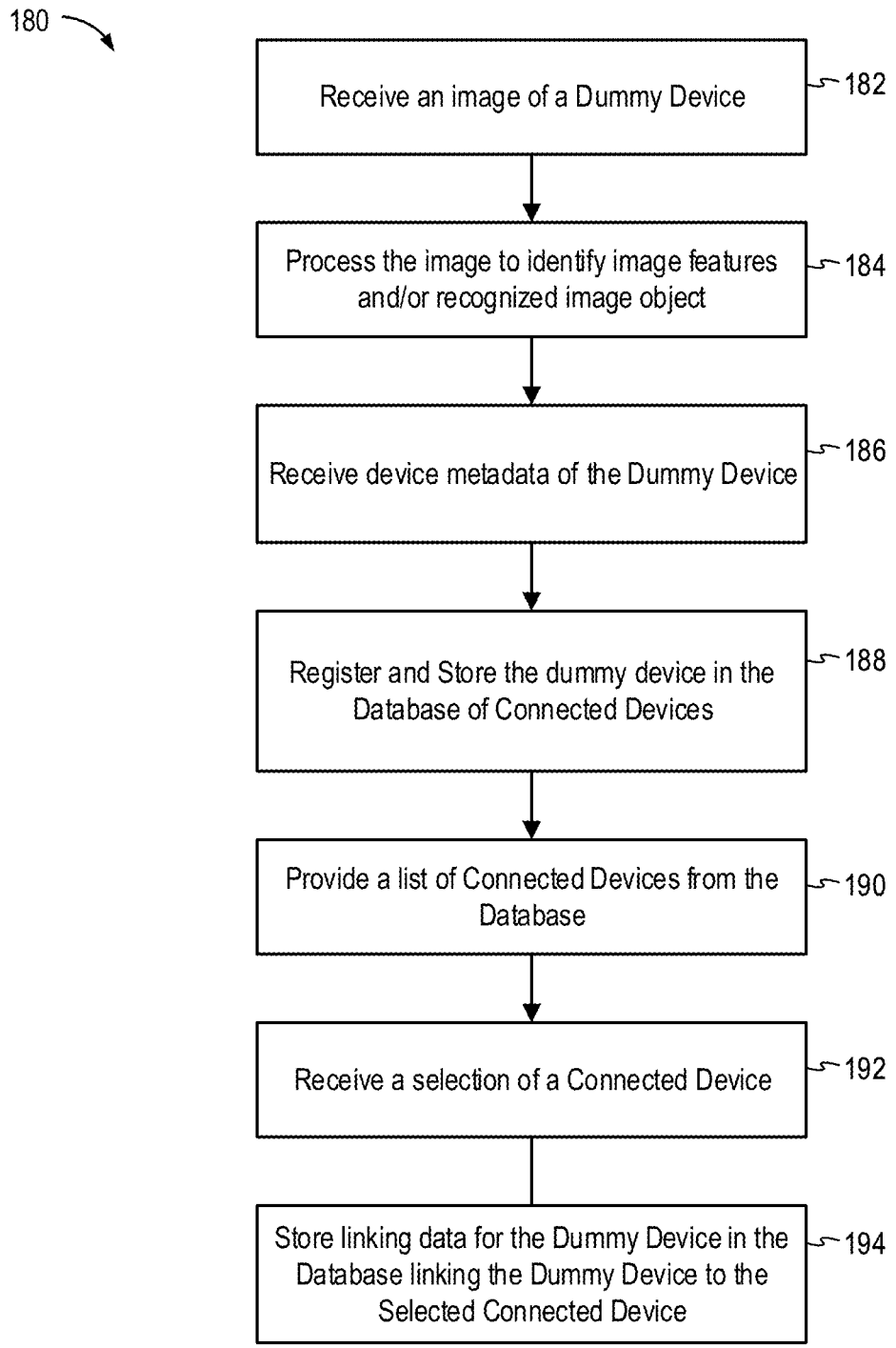
FIG. 5 is a flowchart illustrating a method to on-board a dummy device and link the dummy device in some embodiments.

FIG. 5 is a flowchart illustrating a method to on-board a dummy device and link the dummy device in some embodiments. Referring to FIG. 5, a dummy device on-boarding method 180 may be implemented in a mobile device and executed by the control App in embodiments of the present disclosure. In some embodiments, the dummy device is registered and stored in the database of connected devices in the same manner as a connected device, but the dummy device stores a link to the linked connected device in the database structure of the dummy device.

At step 182, the method 180 initiates the control App and detects an image in the camera field of view where the image contains the dummy device to be on-boarded. It is instructive to note that the on-boarding method does not necessarily require the camera to capture or snap the image. In some embodiments, it is only necessary that an image is present in the camera field of view.

At step 184, the method 180 processes the image to identify the image attributes of the image, that is, to identify the image features and/or a recognized image object in the image. In one embodiment, the computer vision sub-system in the processor of the mobile device may be initiated to scan the image content in the camera field of view. The computer vision sub-system extracts image features from the field of view, which can be used as a unique representation of the dummy device and the device's surrounding environment. In some embodiments, the computer vision sub-system may also run a vision-based object recognition method to recognize the dummy device to be on-boarded.

At step 186, the method 180 receives device metadata associated with the dummy device. In the case of the dummy device, the device metadata may include a device identifier, such as a device name.

At step 188, the method 180 registers the dummy device and stores the dummy device in the database of connected devices. In particular, the dummy device is identified by the image features or recognized image object as the linked image and is stored with the associated device metadata.

At step 190, the method 180 provides a list of connected devices from the database of connected device. For example, the list can be displayed on a user interface of the mobile device. At step 192, the method 180 receives a selection of a connected device. The selected connected device is to be linked to the dummy device registered previously.

At step 194, the method 180 stores linking data of the dummy device in the database linking the dummy device to the selected connected device. The linking data may be stored in the data structure of the dummy device in the database. In some embodiments, the linking data may include information of the selected connected device, such as the device identifier of the connected device.

Using the dummy device on-boarding and linking method 180, one or more dummy devices may be on-boarded and may be linked to connected devices to facilitate the See-this, control-that control scheme, as will be described in more detail below.

Connected Device Retrieval Method

Figure 6:
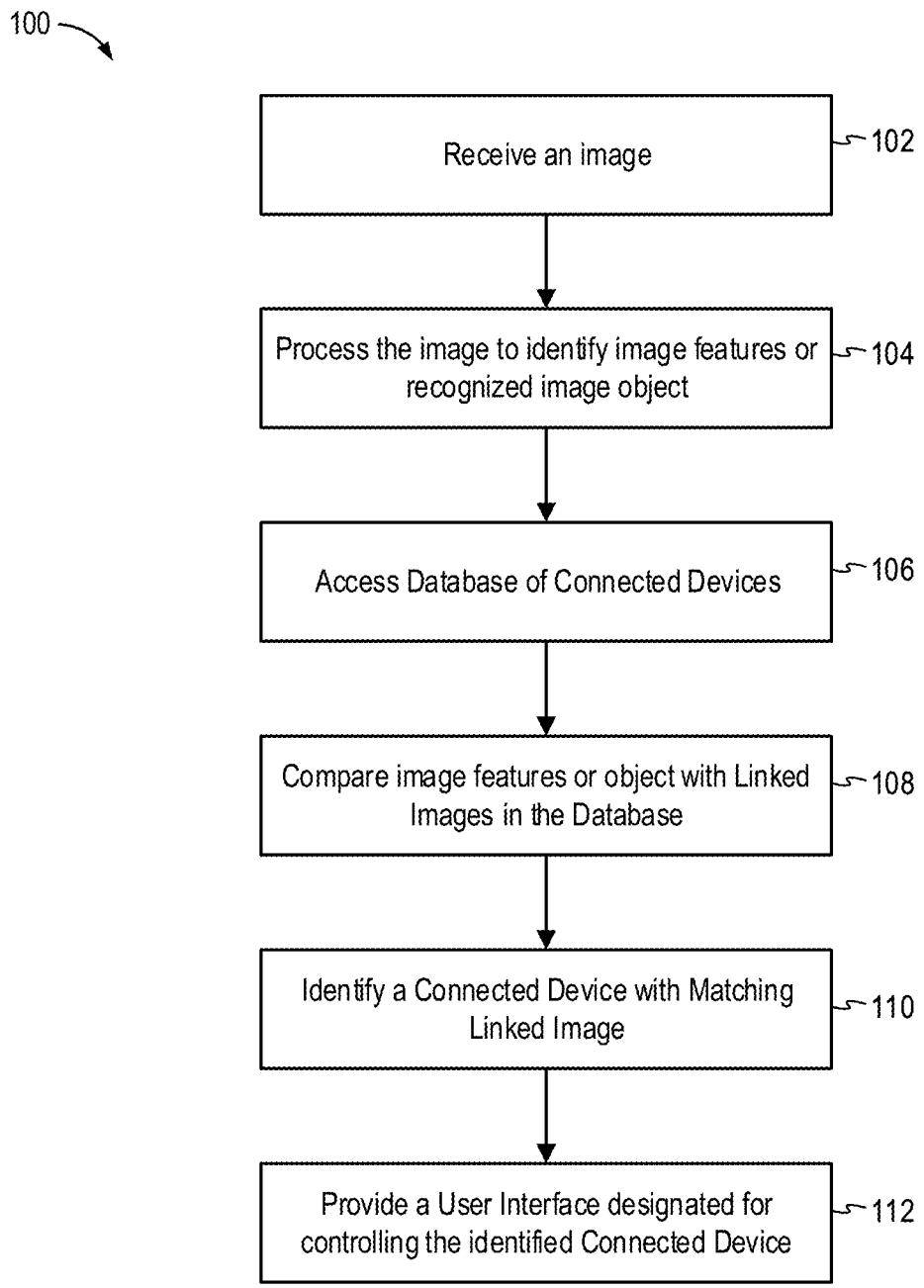
FIG. 6 is a flowchart illustrating a method to retrieve and operate a connected device in some embodiments.

With the connected devices and dummy devices on-boarded, the image-based user interaction system may be deployed to enable simple and easy retrieval and control of multiple connected devices in an environment. FIG. 6 is a flowchart illustrating a method to retrieve and operate a connected device in some embodiments. Referring to FIG. 6, a connected device retrieval method 100 may be implemented in a mobile device and executed by the control App in embodiments of the present disclosure.

At step 102, the method 100 initiates the control App and detects an image in the camera field of view. The image may contain a connected device or a dummy device. It is instructive to note that the retrieval method does not necessarily require the camera to capture or snap the image. In some embodiments, it is only necessary that an image is present in the camera field of view.

At step 104, the method 100 processes the image to identify the image attributes of the image, that is, to identify the image features and/or a recognized image object in the image. In one embodiment, the computer vision sub-system in the processor of the mobile device may be initiated to scan the image content in the camera field of view. The computer vision sub-system extracts image features from the field of view. In some embodiments, the computer vision sub-system may also run a vision-based object recognition method to recognize an image object.

At step 106, the method 100 accesses the database of connected devices. At 108, the method 100 compares the extracted image features or recognized image object with linked images in the database. The compare operation can be performed on the mobile device, such as when the database is stored on the mobile device. The compare operation can also be performed at the hub or on the cloud server, in the cases where the database is stored on the hub or at the cloud server.

At step 110, the method 100 identifies a connected device with the matching linked image. In one embodiment, the extracted image features or recognized image object may match a linked image of the connected device itself. In another embodiment, the extracted image features or recognized image object may match a linked image of the dummy device. In that case, the connected device linked to the dummy device is identified as the connected device.

At step 112, the method 100 provides a user interface designated for controlling the connected device identified by the linked image. For example, the user interface may be provided on the display of the mobile device. In particular, the method 100 selects the designated user interface based on the device metadata associated with the connected device. The device metadata contains information about the connected device, such as the device type, the brand, the model and the property of the device. Using the device metadata, the method 100 provides the designated user interface for the connected device. For example, when the connected device is a lamp, the user interface may provide the control functions of On/Off and brightness control. In another example, when the connected device is a speaker, the user interface may provide the control functions of On/Off and volume control.

As thus configured, the method 100 provides control functions for various types of connected devices through a unified control App. Importantly, the same user interface is presented for the connected devices of the same device type. For example, the environment may include multiple lamps as connected devices, each lamp may be of a different brand, different manufacturers and thus associated with different native control interface. Instead of having the user navigate the different control interfaces for each lamp, the method 100 of the present disclosure provides the same user control interface in the control App for all types of lamps as connected device. A user is thus able to control all of the lamps in his/her environment using the same user interface. The method 100 improves the ease of use and convenience to the user.

In embodiments of the present disclosure, for the purpose of vision-based on-boarding and retrieving process, the image processing operation leverages computer vision and machine learning to identify image features and recognize image object. In some embodiments, various feature extraction methods can be applied, such as Scale-Invariant Feature Transform (SIFT), Speeded-Up Robust Features (SURF), Histogram of oriented gradients (HOG), as well as deep neural network flavor of feature extractors, such as VGGnet, ResNet, etc. In other embodiments, various object recognition methods can be applied, such as Bag of World based classification, as well as deep neural network flavor of object recognition, such as fast-RNN, MobileNet, and Yolo.

In embodiments of the present disclosure, the methods of the present disclosure may process the image by identifying image features and image objects in the foreground of the image. In some cases, foreground and background image features can be distinguished using depth estimation, using an attention network to detect significant object, or selecting the biggest object as the foreground object. In other embodiments, the methods of the present disclosure may process the image by identifying image features and image objects in the foreground as well as in the background. That is, an object, whether a connected device or a dummy device, may be identified by just the object itself in the image or by the object and the surrounding environment in the image. Accordingly, the on-boarding and retrieval methods of the present disclosure may be applied to identify a connected device located in a particular room and to differentiate another identical connected device that may be located in a different room.

For example, the on-boarding method may process an image to identify a lamp. Alternately, the on-boarding method may process an image to identify a lamp in the living room. Subsequently, the retrieval method may identify a lamp in the image and retrieve the lamp from the database of connected devices. Alternately, the retrieval method may identify a lamp in the living room in the image and retrieve the connected device being a lamp located in the living room from the database of connected devices, instead of the same lamp located in the bedroom.

FIG. 7, which includes FIGS. 7(a) and 7(b), illustrates example applications of the image-based user interaction system in some embodiments. FIG. 7(a) illustrates an example of the See-it, Control-it control scheme in some embodiments. Referring to FIG. 7(a), a user wishes to control a lamp. It is assumed that the lamp has been previously on-boarded as a connected device and stored in the database. The user initiates the control App on her mobile device and points the camera of the mobile device at the light. The control App recognizes that the object is a lamp and identifies the lamp as an on-boarded connected device in the system. Immediately, the control App provides the lighting control user interface on the display of the mobile device. The user is then able to control the lamp within control App using the lighting control user interface, as shown in FIG. 7(a). In operation, the user does not need to continue to point the camera at the lamp while navigating the lighting control user interface. In operation, the camera only needs to point to the lamp for a sufficient amount of time for the control App is locked onto the image of the connected device (the lamp). After that, the control App no longer needs the image to continue the operation.

FIG. 7(b) illustrates an example of multiple connected devices in the same view. For example, the image-based user interaction system of the present disclosure may be used to control industrial machinery. In the event that multiple on-boarded devices are detected in the same image, the control App provides a user interface to allow the user to select which connected device to be controlled.

In embodiments of the present disclosure, the image-based user interaction system may capture multiple connected devices at the same time within the camera field of view, either during the on-boarding process or during the retrieval process. In some embodiments, the on-boarding method or the retrieval method will query the user to select an area within the field of view for the computer vision system to focus on. The on-boarding or retrieval method then continues by processing the image in the selected area for visual features or image object.

FIG. 8, which includes FIGS. 8(a) and 8(b), illustrates example applications of the image-based user interaction system in some embodiments. In particular, FIGS. 8(a) and 8(b) illustrate examples of the See-this, Control-that control scheme in some embodiments. Under the See-this, Control-that control scheme, a user on-boards a dummy device and then links the dummy device to the connected device that the user wants to control. In this manner, even if the actual connected device is in a remote location or not in the field of view of the user, the user can still operate the connected device via the dummy device.

FIG. 8(a) illustrates pictorially the See-this, Control-that control scheme in one example. Referring to FIG. 8(a), a connected lamp (connected device A) is on-boarded onto the database and a coffee mug (dummy device B) is also on-boarded. The coffee mug is linked to the connected lamp. Thereafter, when the user scans the coffee mug, the image-based user interaction system identifies the coffee mug and retrieves the user interface for controlling the lamp. In this manner, the user is able to operate the lamp via the coffee mug.

FIG. 8(b) illustrates another example of applying the See-this, Control-that control scheme in one example. In this example, a user wants to control a television (not shown) in the living room, the user initiates the control App and points the mobile device at the coffee mug located in the kitchen. It is assumed that both the television and the coffee mug have both been previously on-boarded and linked. As a result of the image of the coffee mug being presented to the control App, the App recognizes the coffee mug that was previously on-boarded and linked to the television. Immediately, the control App provides television control user interface on the display of the mobile device. For example, the television control user interface may provide a volume control button and a program channel selection button. In this manner, the user is then able to control the television using control App on the mobile device using the television control user interface—even though the television is in a different room. In operation, the user does not need to continue to point the camera at the coffee mug while navigating the television control user interface.

In general, under the See-this, Control-that control scheme, the user on-boards both device A (connected device) and device B (dummy device) and then link device B to device A. Subsequently, the user can scan device B and the control App will displays device A's control user interface on the display. The user can then control device A within the control App. In some embodiments, the user may use the control App to remotely add or delete hidden digital content associated with the dummy device.

The See-this, Control-that control scheme provides many advantages features. Using a dummy device, the image-based user interaction system enables the user to control a connected device even if the connected device is out of reach by voice command, by touch or by IR remote. The image-based user interaction system enables the user to save time when searching for the right control interface matching to each particular connected device. In operation, the user may trigger the control user interface using the connected device or a dummy device linked to the connected device.

According to embodiments of the present disclosure, the image-based user interaction system enables control of a retrieved connected device using a user interface designated for the device type of the connected device. The operation of the connected device can be carried out as follows. In one example, the user gives a command (e.g. button press) on the user interface of the control application to turn on a connected lamp. The control application receives the button press event and converts the event to a standardized data-interchange format, such as JSON and xml.

Then, the transmitter sub-system in the communication interface of the mobile device sends out the command in a suitable format either to a gateway (a hub) that helps to route the signal or to the end device (e.g. a lamp). The transition can be done either through a wired connection (e.g. USB, UART, I2C, etc.), or through a wireless connection (e.g. Wi-Fi, Bluetooth, Zigbee, Thread).

In one embodiment, the gateway (hub) receives the command data and routes the command data to a particular end device according to the device metadata carried by the command data. In another embodiment, the end device receives the command data directly according to the device metadata carried by the command data.

The receiver sub-system on communication interface of the end device listens to the incoming command and receives the command designated to the end device. The command parsing sub-system of the end device parses the incoming command data and converts it to an action that can be executed by the end device. The user's command is finally executed by the end device.

Retrieving Connected Devices by User Facial Recognition

Accordingly, to another aspect of the present disclosure, the image-based user interaction system is configured to provide the user with a list of device control user interfaces based on a face scan of the user. In some embodiments, the system provides a list of most frequently used device control user interfaces associated with the user. In other embodiments, the system provides a list of most recently used device control user interfaces associated with the user. In other embodiments, the system provides a list of device control user interfaces predefined by the user.

Figure 9:
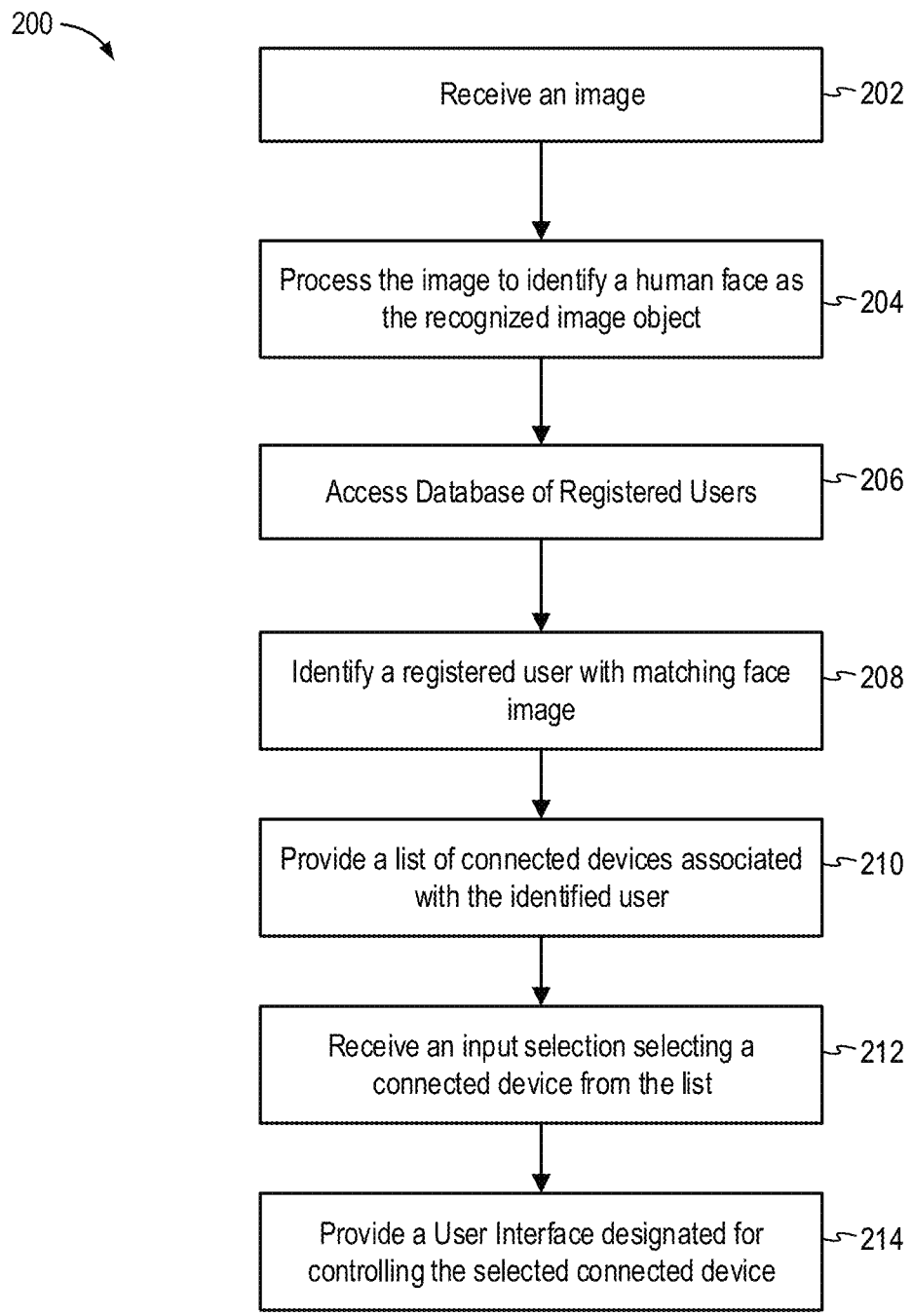
FIG. 9 is a flowchart illustrating a facial recognition retrieval method in some embodiments.

FIG. 9 is a flowchart illustrating a facial recognition retrieval method in some embodiments. Referring to FIG. 9, a facial recognition retrieval method 200 may be implemented in a mobile device and executed by the control App in embodiments of the present disclosure.

At step 202, the method 200 initiates the control App and detects an image in the camera field of view. The image may contain a human face. It is instructive to note that the retrieval method does not necessarily require the camera to capture or snap the image. In some embodiments, it is only necessary that an image is present in the camera field of view.

At step 204, the method 200 processes the image to identify a human face as the recognized image object. In one embodiment, a face recognition sub-system in the processor of the mobile device may be initiated to scan the face image in the camera field of view and to recognize the user associated with the face image.

At step 206, the method 200 access a database of registered users. Each registered user being identified by a linked face image and being associated with usage data for one or more connected devices. At step 208, the method 200 identifies a registered user in the database by matching the face image identified in the image to the linked face image of the registered user.

At step 210, in response to identifying the registered user, the method 200 provides a list of connected devices associated with the user. The list can be a list of most frequently used connected devices, or a list of most recently used connected devices, or a predefined list of connected devices.

At step 212, the method 200 receives an input selection selecting a connected device from the list. At step 214, the method 200 provides a user interface designated for controlling the selected connected device.

Figure 10:
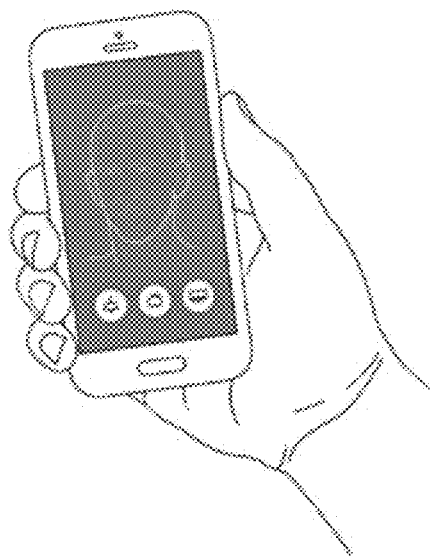
FIG. 10 illustrates on example of the operation of the facial recognition retrieval method.

FIG. 10 illustrates on example of the operation of the facial recognition retrieval method. Referring to FIG. 10, the control App on the mobile device recognizes the face image presented as a registered user and provides the user with a list of connected devices—a lamp, a television and a game console—on the control App. The user can then quickly select a connected device to operate.

In some embodiments, a machine learning sub-system of the processor of the mobile device running in the background can learn the frequently used devices of the user. The machine learning sub-system collects user behavior and maintains a list of frequently used device of the user. This feature is particularly useful when multiple users share the same application account. The machine learning sub-system may be configured to run in the background to collect user behavior for each of the multiple users and to identify the list of frequently used device for each user.

In one embodiment, the machine learning sub-system running on the background collects event information, such as device name/ID, user name/ID, time stamp, temperature, etc. The machine learning sub-system trains a machine learning model, such as decision tree, neural network, etc., to learn the unique pattern for each user. Next time, once a particular user scans his/her face, the machine learning sub-system uses all the current factors as input and estimated the most possible devices that the user wants to operate. The machine learning sub-system can also have on-line learning capability that continuously learn user's behavior and improve the estimation result.

Retrieving Connected Devices by Geolocation

Conventional control Apps provides the same user interface for all users under all circumstances, regardless of the physical locations of the users. In reality, location information can be helpful to the user to access the most relevant connected devices more efficiently. In practice, most of the time, users tend to operate connected devices that are nearby. In embodiments of the present disclosure, the geolocation information is used as a filter to retrieve devices within the vicinity of the user. A positioning sub-system in the processor of the mobile device provides geolocation information associated with the user. In some cases, the geolocation information does not have to be very accurate. For the purpose of the geolocation retrieval method, the mobile device only needs to provide the geolocation information to indicate which area or which room the user is located.

In embodiments of the present disclosure, the geolocation retrieval method can implement various methods of acquiring geolocation information. In one example, vision-based methods such as Simultaneous localization and mapping (SLAM) allows the system to construct or update a map of an unknown environment while simultaneously keeping track of location within it. In another example, Beacon-based methods use, e.g. Bluetooth low energy (BLE), to detect the proximity of connected devices. In another example, sensor-based methods, such as motion sensor, proximity sensor, or Infra-Red sensor, can detect occupancy of the room. In another example, Wi-Fi positioning system (WPS) provides geo-location information by measuring the intensity of the received Wi-Fi signal from different access points (AP). The geolocation retrieval method can implement any of these aforementioned methods of acquiring geolocation information or other suitable methods.

Figure 11:
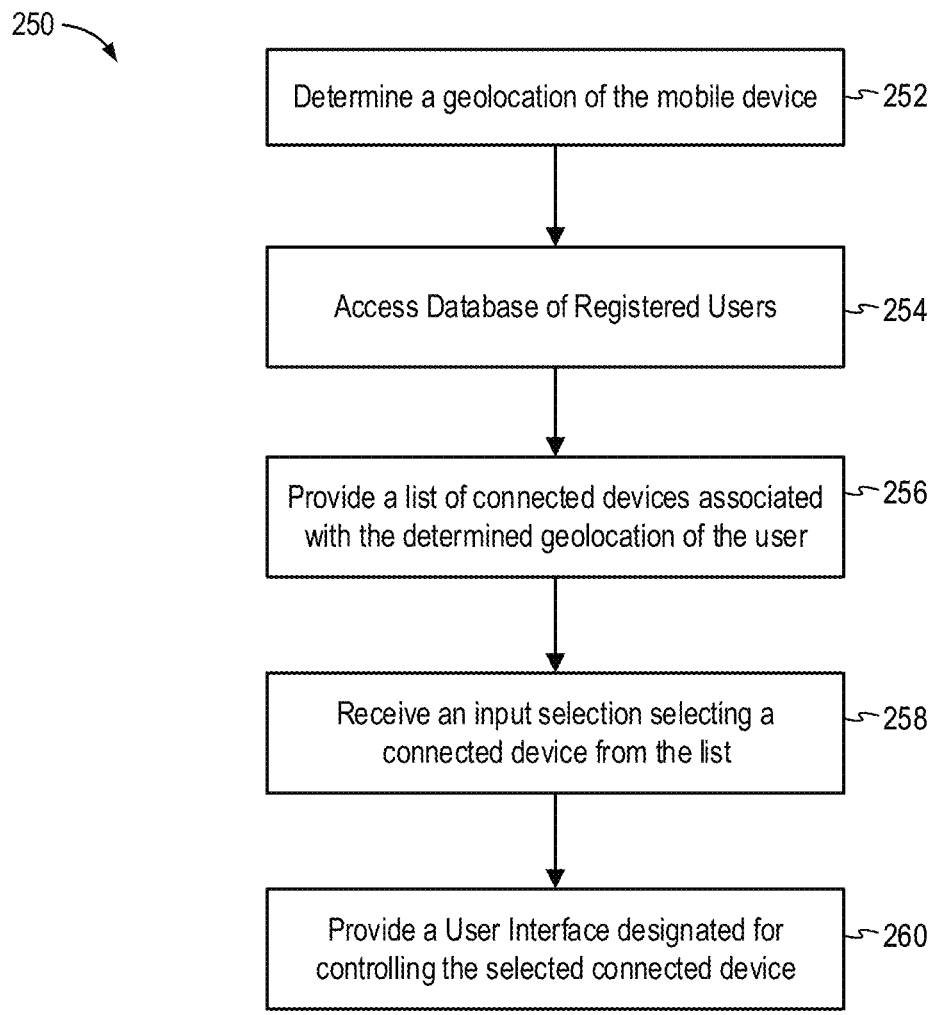
FIG. 11 is a flowchart illustrating a geolocation retrieval method in some embodiments.

FIG. 11 is a flowchart illustrating a geolocation retrieval method in some embodiments. Referring to FIG. 11, a geolocation retrieval method 250 may be implemented in a mobile device and executed by the control App in embodiments of the present disclosure.

At step 252, the method 250 initiates the control App and determines a geolocation of the mobile device. At step 254, the method 250 accesses a database of connected devices. The database of connected devices stores the geolocation and usage data of each connected device. For example, the usage data may include the frequency of use and the last time and date the connected device has been assessed. In some embodiments, the usage data and/or the geolocation of each connected device may be recorded for a given user or a given user account. In one example, the method 250 assesses the database to obtain device usage information associated with the determined geolocation. In another example, the method 250 obtains device usage information associated with a given user at the determined geolocation.

At step 256, the method 250 provides a list of connected devices associated with the determined geolocation. For example, the list of connected devices includes connected devices that are in the vicinity of the determined geolocation.

At step 258, the method 250 receives an input selection selecting a connected device from the list. At step 260, the method 250 provides a user interface designated for controlling the selected connected device.

Figure 12:
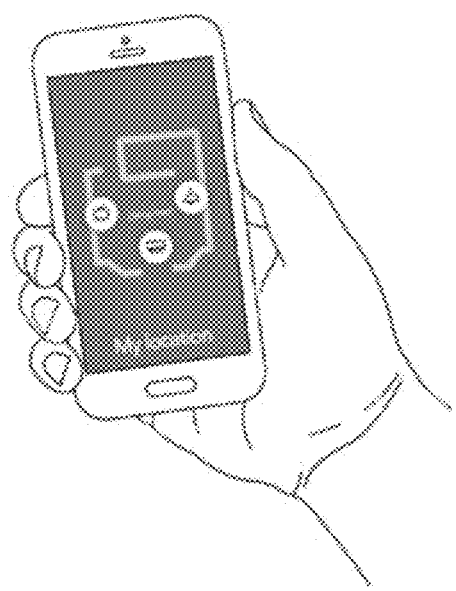
FIG. 12 illustrates on example of the operation of the geolocation retrieval method.

FIG. 12 illustrates on example of the operation of the geolocation retrieval method. Referring to FIG. 12, the control App on the mobile device determines the geolocation of the user and provides the user with a list of connected devices—a lamp, a television and a game console—on the control App. In one embodiment, the list of connected devices is provided on a map and the connected devices are shown at their relative location on the map. In this manner, the user can quickly select a connected device to operate.

In alternate embodiments of the present invention, the image-based user interaction system and method of the present disclosure can be implemented in a remote server, such as a cloud server, that is connected to a mobile device over a data network. The mobile device may be connected to the remote server through wired or wireless connection. The user uses a mobile device to capture an image and the image is transferred to the cloud server for feature extraction and object identification as described above. The remote server provides the user interface for the identified connected device to the mobile device of the user. The implementation of the image-based user interaction system and method in a mobile device described above is illustrative only and not intended to be limiting.

The above detailed descriptions are provided to illustrate specific embodiments of the present disclosure and are not intended to be limiting. Numerous modifications and variations within the scope of the present disclosure are possible. The present disclosure is defined by the appended claims.

What is claimed is:

1. A method in a mobile device for controlling a connected device, comprising:
   receiving, at the mobile device, an image of an alternate object, wherein the alternate object is different from the connected device for controlling and is linked to the connected device according to a user's registering;
   processing, at the mobile device, the image of the alternate object to identify at least a first image attribute, the first image attribute comprising an image feature or an image object;
   accessing, by the mobile device, a database of connected devices, each connected device in the database being identified by a linked image and being associated with device metadata describing at least a device type of the connected device;
   comparing the first image attribute with linked images corresponding to the connected devices stored in the database;
   identifying a first connected device by a linked image among the linked images stored in the database that has an image attribute matching the first image attribute; and
   in response to the identifying, providing, at the mobile device, a user interface configured to control the first connected device, the user interface comprising a control function corresponding to the device type of the first connected device.

2. The method of claim 1, wherein receiving, at the mobile device, the image comprises:
   activating, at the mobile device, a control application; and
   detecting, at the control application on the mobile device, the image.

3. The method of claim 1, wherein:
   accessing the database of connected devices comprises accessing the database of connected devices including a first set of connected devices, each connected device in the first set of connected devices being identified by a linked image of the respective connected device itself; and
   identifying the first connected device comprises identifying the first connected device having a linked image matching the first image attribute, the first image attribute being associated with the first connected device.

4. The method of claim 1, wherein:
   accessing the database of connected devices comprises accessing the database of connected devices including a second set of alternate devices, each alternate device in the second set of alternate devices being different from the connected device for controlling and linked to a respective connected device according to the user's registering and being identified by a linked image of the alternate object; and
   identifying the first connected device comprises identifying a first alternate device having a linked image matching the first image attribute and retrieving the linked connected device of the first alternate device as the first connected device.

5. The method of claim 1, further comprising:
   activating, at the mobile device, a control application;

receiving, at the control application on the mobile device, an image of a connected device;

processing, at the mobile device, the image to identify at least a second image attribute, the second image attribute comprising an image feature or an image object;

receiving, at the mobile device, device metadata associated with the connected device;

registering, using the mobile device, the connected device using the second image attribute as the linked image and the device metadata; and storing, at the database, the connected device identified by the linked image and being associated with the device metadata.

6. The method of claim 5, further comprising:

activating, at the mobile device, a control application;

receiving, at the control application on the mobile device, an image of an alternate device, wherein the alternate device is different from the connected device for controlling and linked to a respective connected device according to the user's registering;

processing, at the mobile device, the image to identify at least a third image attribute, the third image attribute comprising an image feature or an image object;

receiving, at the mobile device, device metadata associated with the alternate device;

registering, using the mobile device, the alternate device using the third image attribute as the linked image and the device metadata;

storing, at the database, the alternate device identified by the linked image and being associated with the device metadata;

providing the list of connected devices from the database;

receiving, at the mobile device, a selection of a connected device; and storing, at the database, linking data of the alternate device linking the selected connected device to the alternate device.

7. The method of claim 1, wherein accessing the database of connected devices comprises:

storing the database on the mobile device; and accessing the database from the mobile device.

8. The method of claim 1, wherein accessing the database of connected devices comprises:

storing the database on a hub installed in an environment and associated with one or more connected devices in the environment; and accessing the database on the hub through a local area network.

9. The method of claim 1, wherein accessing the database of connected devices comprises:

storing the database on a remote server; and accessing the database on the remote server through a data network.

10. The method of claim 1, wherein processing the image to identify at least a first image attribute comprises:

processing the image to identify plurality of objects in the image; and receiving, on the mobile device, a selection of one of the plurality of objects to be processed to identify the first image attribute.

11. The method of claim 1, wherein processing the image to identify at least a first image attribute comprises:

processing the image to identify a foreground object as the first image attribute or processing the image to identify a foreground object with a given background image as the first image attribute.

12. The method of claim 1, wherein processing the image to identify at least a first image attribute comprises processing the image to identify a face image of a human as the first image attribute, and the method further comprises:

accessing, by the mobile device, a second database of registered users, each user being identified by a linked face image and being associated with usage data for one or more connected devices;

identifying a first registered user having a linked face image matching the face image identified in the image;

in response to the identifying, providing, at the mobile device, a second user interface including a list of most frequently used connected devices associated with the first registered user; and in response to receiving an input selecting a second connected device on the second user interface, providing, at the mobile device, the user interface configured to control the second connected device, the user interface comprising a control function corresponding to the device type of the second connected device.

13. The method of claim 1, further comprising:

determining, at the mobile device, a geolocation of the mobile device;

accessing, by the mobile device, the database of connected devices, each connected device being associated with a geolocation and usage data;

in response to the determining, providing, at the mobile device, a third user interface including a list of connected devices associated with the geolocation; and in response to receiving an input selecting a third connected device on the third user interface, providing, at the mobile device, the user interface configured to control the third connected device, the user interface comprising a control function corresponding to the device type of the third connected device.

14. The method of claim 13, wherein each connected device in the database is further associated with a user and providing the third user interface including the list of connected devices associated with the geolocation comprises:

providing the third user interface including the list of connected devices associated with the geolocation and a given user.

15. A system for controlling a connected device, comprising:

an imaging sensing device configured to receive an image of an alternate object, wherein the alternate object is different from the connected device for controlling and is linked to the connected device according to a user's registering;

a processor;

a communication interface;

a display; and a memory coupled with the processor, wherein the memory is configured to provide the processor with instructions which when executed cause the processor to:

receive an image of the alternate object;

process the image of the alternate object to identify at least a first image attribute, the first image attribute comprising an image feature or an image object;

access a database of connected devices, each connected device in the database being identified by a linked image and being associated with device metadata describing at least a device type of the connected device;

compare the first image attribute with the linked images corresponding to the connected devices stored in the database;

identify a first connected device by a linked image among the linked images stored in the database that has an image attribute matching the first image attribute; and in response to the identifying, provide a user interface configured to control the first connected device, the user interface comprising a control function corresponding to the device type of the first connected device.

16. The system recited in claim 15, wherein the memory is further configured to provide the processor with instructions which when executed cause the processor to:

access the database of connected devices including a first set of connected devices, each connected device in the first set of connected devices being identified by a linked image of the respective connected device itself; and identify the first connected device having a linked image matching the first image attribute, the first image attribute being associated with the first connected device.

17. The system recited in claim 15, wherein the memory is further configured to provide the processor with instructions which when executed cause the processor to:

access the database of connected devices including a second set of alternate devices, each alternate device in the second set of alternate devices being different from the connected device for controlling and linked to a respective connected device according to the user's registering and being identified by a linked image of the alternate object; and identify a first alternate device having a linked image matching the first image attribute and retrieving the linked connected device of the first alternate device as the first connected device.

18. A method for controlling a connected device, comprising:

receiving, at a remote server, an image of an alternate object from a mobile device, wherein the alternate object is different from the connected device for controlling and linked to the connected device according to a user's registering;

processing, at the remote server, the image of the alternate object to identify at least a first image attribute, the first image attribute comprising an image feature or an image object;

accessing, by the remote server, the database of connected devices, each connected device in the database being identified by a linked image and being associated with device metadata describing at least a device type of the connected device;

comparing, at the remote server, the first image attribute with linked images corresponding to the connected devices stored in the database;

identifying, at the remote server, a first connected device by a linked image among the linked images stored in the database that has an image attribute matching the first image attribute; and in response to the identifying, providing, by the remote server to the mobile device, a user interface configured to control the first connected device, the user interface comprising a control function corresponding to the device type of the first connected device.

19. The method of claim 18, wherein:

accessing the database of connected devices comprises accessing the database of connected devices including a first set of connected devices, each connected device in the first set of connected devices being identified by a linked image of the respective connected device itself; and identifying the first connected device comprises identifying the first connected device having a linked image matching the first image attribute, the first image attribute being associated with the first connected device.

20. The method of claim 18, wherein:

accessing the database of connected devices comprises accessing the database of connected devices including a second set of alternate devices, each alternate device in the second set of alternate devices being different from the connected device for controlling and linked to a respective connected device according to the user's registering and being identified by a linked image of the alternate object; and identifying the first connected device comprises identifying a first alternate device having a linked image matching the first image attribute and retrieving the linked connected device of the first alternate device as the first connected device.

* * * * *